US012010408B2

United States Patent
Feng et al.

(10) Patent No.: US 12,010,408 B2
(45) Date of Patent: Jun. 11, 2024

(54) AUTOMATIC FOCUS DISTANCE EXTENSION

(71) Applicant: QUALCOMM INCORPORATED, San Diego, CA (US)

(72) Inventors: Wen-Chun Feng, New Taipei (TW); Mian Li, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/627,261

(22) PCT Filed: Nov. 6, 2019

(86) PCT No.: PCT/CN2019/115941
§ 371 (c)(1),
(2) Date: Jan. 14, 2022

(87) PCT Pub. No.: WO2021/000483
PCT Pub. Date: Jan. 7, 2021

(65) Prior Publication Data
US 2023/0156301 A1    May 18, 2023

(51) Int. Cl.
*H04N 23/45* (2023.01)
*H04N 23/67* (2023.01)
*H04N 23/69* (2023.01)

(52) U.S. Cl.
CPC ........... *H04N 23/45* (2023.01); *H04N 23/673* (2023.01); *H04N 23/69* (2023.01)

(58) Field of Classification Search
CPC ...... H04N 23/45; H04N 23/667; H04N 23/67; H04N 23/673; H04N 23/90

USPC ........................................................ 348/345
See application file for complete search history.

(56) References Cited

U.S. PATENT DOCUMENTS

| | | | |
|---|---|---|---|
| 2003/0020814 A1* | 1/2003 | Ono | H04N 23/00 348/E5.042 |
| 2003/0160886 A1 | 8/2003 | Misawa et al. | |
| 2017/0208239 A1 | 7/2017 | Chien et al. | |
| 2017/0244896 A1* | 8/2017 | Chien | G03B 3/10 |

(Continued)

FOREIGN PATENT DOCUMENTS

| | | |
|---|---|---|
| CN | 105100557 A | 11/2015 |
| CN | 105308947 A | 2/2016 |

(Continued)

OTHER PUBLICATIONS

International Search Report and Written Opinion—PCT/CN2019/093939—ISA/EPO—dated Mar. 27, 2020.

(Continued)

*Primary Examiner* — Anthony J Daniels
(74) *Attorney, Agent, or Firm* — QUALCOMM Incorporated

(57) ABSTRACT

Aspects of the present disclosure relate to systems and methods for image focusing for devices including multiple cameras. An example method includes estimating a focus distance associated with an image captured by a first camera, determining, based at least in part on the estimated focus distance, to switch from the first camera to a second camera, switching from the first camera to the second camera, completing a focusing operation using the second camera and presenting an updated image captured by the second camera.

25 Claims, 6 Drawing Sheets

(56) References Cited

U.S. PATENT DOCUMENTS

| | | | |
|---|---|---|---|
| 2017/0359494 A1 | 12/2017 | Zhou et al. | |
| 2018/0191945 A1* | 7/2018 | Chen | H04N 23/63 |
| 2018/0205891 A1 | 7/2018 | Conway, Sr. et al. | |
| 2019/0037128 A1 | 1/2019 | Wang et al. | |
| 2019/0068893 A1* | 2/2019 | Kim | H04N 23/631 |
| 2019/0356852 A1* | 11/2019 | Miyazaki | H04N 23/671 |
| 2020/0007777 A1* | 1/2020 | Huang | H04N 23/63 |
| 2020/0296270 A1* | 9/2020 | Zhou | H04N 23/45 |
| 2020/0336672 A1* | 10/2020 | Zhang | H04N 23/671 |
| 2023/0288664 A1* | 9/2023 | Baer | H04N 23/67 |
| | | | 348/75 |

FOREIGN PATENT DOCUMENTS

| | | |
|---|---|---|
| CN | 105959553 A | 9/2016 |
| CN | 106303258 A | 1/2017 |
| CN | 106506957 A | 3/2017 |
| CN | 106791374 A | 5/2017 |
| CN | 104363379 B | 6/2017 |
| CN | 107277355 A | 10/2017 |
| CN | 108353126 A | 7/2018 |
| CN | 109120821 A | 1/2019 |
| CN | 109309786 A | 2/2019 |
| CN | 109409147 A | 3/2019 |
| CN | 109428997 A | 3/2019 |
| CN | 109639974 A | 4/2019 |
| JP | H10108057 A | 4/1998 |
| JP | 2006191289 A | 7/2006 |

OTHER PUBLICATIONS

International Search Report and Written Opinion—PCT/CN2019/115941—ISA/EPO—dated Apr. 2, 2020.
Supplementary European Search Report—EP19936100—Search Authority—Munich—dated Jun. 19, 2023.

* cited by examiner

600

```
┌─────────────────────────────────────────────────────────────┐
│  Estimate a focus distance associated with an image         │
│  captured by a first camera. (602)                          │
└─────────────────────────────────────────────────────────────┘
                              │
                              ▼
┌─────────────────────────────────────────────────────────────┐
│  Determine, based at least in part on the estimated focus   │
│  distance, whether to switch from the first camera to a     │
│  second camera. (604)                                       │
└─────────────────────────────────────────────────────────────┘
                              │
                              ▼
┌─────────────────────────────────────────────────────────────┐
│  Switch from the first camera to the second camera. (606)   │
└─────────────────────────────────────────────────────────────┘
                              │
                              ▼
┌─────────────────────────────────────────────────────────────┐
│  Complete a focusing operation using the second camera. (608)│
└─────────────────────────────────────────────────────────────┘
                              │
                              ▼
┌─────────────────────────────────────────────────────────────┐
│  Present an updated image captured by the second camera. (610)│
└─────────────────────────────────────────────────────────────┘
```

FIG. 6

AUTOMATIC FOCUS DISTANCE EXTENSION

CROSS-REFERENCE TO RELATED APPLICATIONS

This Application is a National Stage Application, filed under 35 U.S.C. § 371, of Patent Cooperation Treaty (PCT) Patent Application Serial No. PCT/CN2019/115941 entitled "AUTOMATIC FOCUS DISTANCE EXTENSION" and filed on Nov. 6, 2019, which is incorporated herein by reference in its entirety. PCT Patent Application Serial No. PCT/CN2019/115941 claims priority to PCT Provisional Patent Application No. PCT/CN2019/093939 entitled "AUTOMATIC FOCUS DISTANCE EXTENSION" and filed on Jun. 29, 2019, which is also incorporated by reference in this Patent Application.

TECHNICAL FIELD

This disclosure relates generally to systems and methods for image capture devices, and more specifically to capturing images using devices having two or more cameras.

BACKGROUND OF RELATED ART

Devices including or coupled to two or more digital cameras use a camera lens to focus incoming light onto a camera sensor for capturing digital images. The curvature of a camera lens places a range of depth of the scene in focus. Portions of the scene that are closer to or further from the range of depth may be out of focus, and therefore may appear blurry in a captured image. The distance between the camera lens and the camera sensor (the "focal length") is directly related to the distance between the range of depth of the scene and the camera sensor that is in focus (the "focus distance").

Many devices are capable of adjusting the focal length of the camera, for example, by moving the camera lens to adjust the distance between the camera lens and the camera sensor. Many devices may also automatically determine the focal length of the camera. For example, a user may touch an area of an image, such as a preview image (such as a person or landmark in the previewed scene) provided by the device to indicate the portion of the scene that is in focus. In response to the user input, the device may automatically perform an autofocus (AF) operation to adjust the focal length so that the portion of the scene indicated by the user is in focus. The device may then use the determined focal length for subsequent image captures (including generating subsequent preview images).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for compensating for camera movement during camera focus operations. An example device includes a memory storing instructions and a processor. The processor is coupled to the memory and is configured to receive an image from a first camera, estimate a focus distance associated with the image, determine, based at least in part on the estimated focus distance, whether to switch from the first camera to a second camera, switch from the first camera to the second camera, and complete a focusing operation using the second camera. In some implementations, the processor may also be configured to present an updated image captured by the second camera.

In some implementations, the processor is configured to determine whether to switch from the first camera to the second camera by determining that the estimated focus distance is outside of a first range of focus distances associated with the first camera and within a second range of focus distances associated with the second camera.

In some implementations the focusing operation begins prior to switching from the first camera to the second camera.

In some implementations, the processor is configured to switch from the first camera to the second camera during the focusing operation by adjusting a field of view (FOV) of the second camera to match an FOV of the first camera. In some aspects the FOV of the first camera is selected by a user of the image capture device. In some other aspects the processor is further configured to capture an image, using the second camera, at the FOV selected by the user.

In some implementations, the focusing operation may include a coarse focusing operation and a fine focusing operation. In some aspects, the processor is configured to switch from the first camera to the second camera during the coarse focusing operation. In some other aspects, the processor is configured to complete the focusing operation without the second camera using the coarse focusing operation.

In some implementations the processor is configured to determine whether to switch from the first camera to the second camera by determining that the estimated focus distance is below a focus distance threshold associated with the first camera.

In some implementations the image capture device further includes a third camera, wherein each of the first camera, the second camera, and the third camera is associated with a corresponding range of focus distances. In some aspects the processor is further configured to determine, based at least in part on the estimated focus distance, whether to switch from the first camera to the third camera.

In some implementations, the processor is configured to switch from the first camera to the second camera by applying one or more spatial transforms to compensate for one or more differences in alignment or offset between the first camera and the second camera.

In another example, a method, performed by an image capture device, is disclosed. The example method includes estimating a focus distance associated with an image captured by a first camera, determining, based at least in part on the estimated focus distance, whether to switch from the first camera to a second camera, switching from the first camera to the second camera, completing a focusing operation using the second camera, and presenting an updated image captured by the second camera. In some implementations, the method may also include presenting an updated image captured by the second camera.

In some implementations the focusing operation begins prior to switching from the first camera to the second camera.

In some implementations determining whether to switch from the first camera to the second camera includes determining that the estimated focus distance is outside of a first range of focus distances associated with the first camera and within a second range of focus distances associated with the second camera.

In some implementations switching from the first camera to the second camera includes adjusting a field of view (FOV) of the second camera to match an FOV of the first camera. In some aspects the FOV of the first camera is selected by a user of the image capture device. In some aspects the method further includes capturing an image, using the second camera, at the FOV selected by the user.

In some implementations, the focusing operation includes a coarse focusing operation and a fine focusing operation. In some aspects switching from the first camera to the second camera occurs during the coarse focusing operation. In some other aspects, the focusing operation is completed without the second camera using the coarse focusing operation.

In some implementations, determining to switch from the first camera to the second camera includes determining that the estimated focus distance is below a focus distance threshold associated with the first camera.

In some implementations, the image capture device includes a third camera, wherein each of the first camera, the second camera, and the third camera is associated with a corresponding range of focus distances. In some aspects the method further includes determining, based at least in part on the estimated focus distance, whether to switch from the first camera to the third camera.

In some implementations, switching from the first camera includes applying one or more spatial transforms to compensate for one or more differences in alignment or offset between the first camera and the second camera.

In another example, a non-transitory computer readable storage medium is disclosed. The non-transitory computer readable storage medium may store instructions that, when executed by one or more processors of an image capture device, cause the image capture device to estimate a focus distance associated with an image captured by a first camera, determine, based at least in part on the estimated focus distance, whether to switch from the first camera to a second camera, switch from the first camera to the second camera, and complete a focusing operation using the second camera. In some implementations, execution of the instructions may also cause the image capture device to present an updated image captured by the second camera.

In some implementations, execution of the instructions further causes the image capture device to begin the focusing operation prior to switching from the first camera to the second camera.

In some implementations, execution of the instructions to determine whether to switch from the first camera to the second camera cause the image capture device to determine that the estimated focus distance is outside of a first range of focus distances associated with the first image camera and within a second range of focus distances associated with the second camera.

In some implementations execution of the instructions to switch from the first camera to the second camera causes the image capture device to adjust a field of view (FOV) of the second camera to match an FOV of the first camera.

In some implementations the focusing operation includes a coarse focusing operation and a fine focusing operation. In some aspects execution of the instructions to switch from the first camera to the second camera causes the image capture device to switch from the first camera to the second camera during the coarse focusing operation.

In some implementations, execution of the instructions to determine whether to switch from the first camera to the second camera causes the image capture device to determine that the estimated focus distance is below a focus distance threshold associated with the first camera.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 6 is an illustrative flow chart depicting an example operation for switching an active camera in an image capture device, according to some implementations.

DETAILED DESCRIPTION

Figure 1:
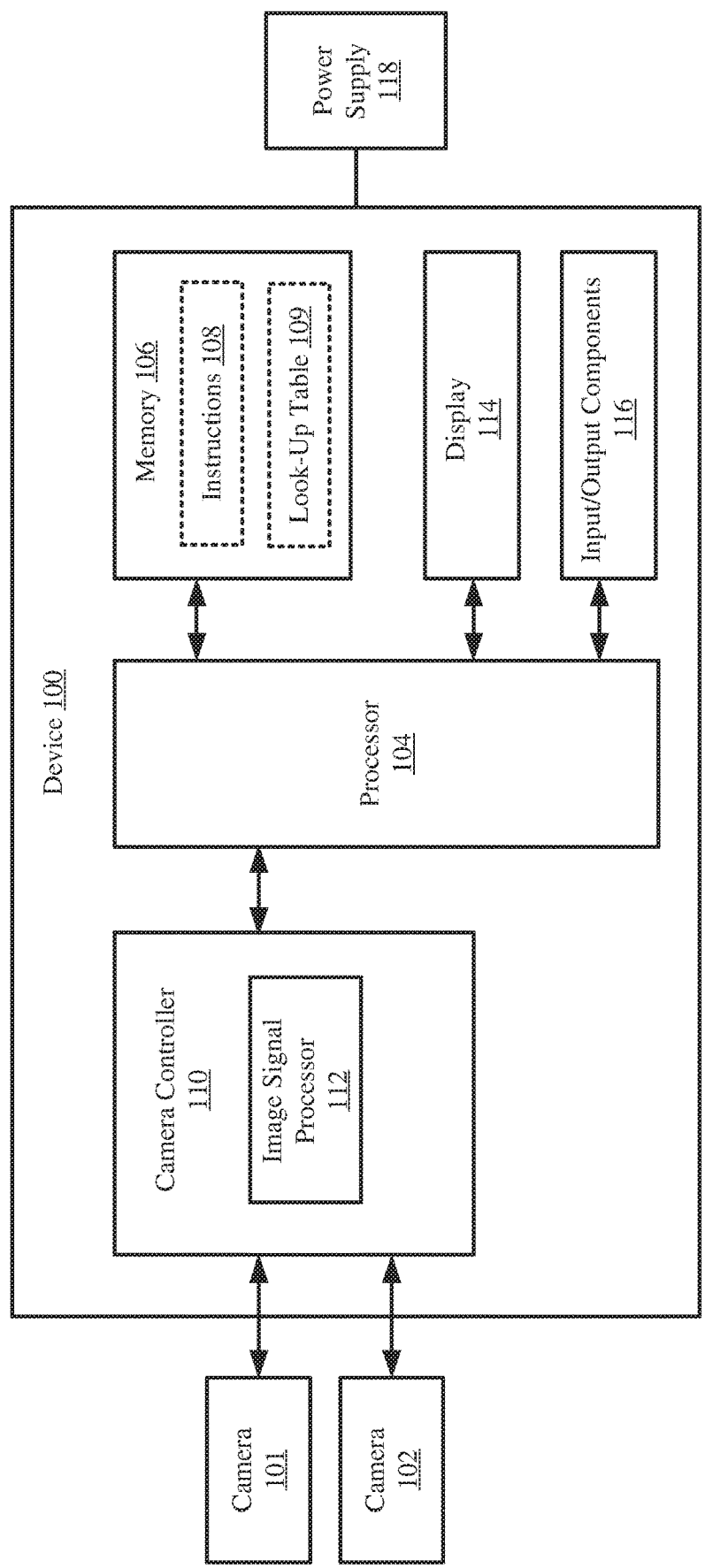
FIG. 1 is a block diagram of an example device.

Aspects of the present disclosure may be used for automatically and seamlessly switching between cameras of an image capture device based on an estimated focal length. As used herein, switching between cameras may refer to selecting an inactive camera of a device to become the active camera (or the master camera) and switching the currently active camera to become the inactive camera (or the slave camera). Often, image capture devices (such as mobile phones) may include multiple different cameras, each having a different range of focal lengths. For example, an image capture device may include a wide angle camera configured for capturing images at relatively wide angles and may include a telephoto camera configured for capturing images at relatively narrower angles. A user of such an image capture device may need to switch between the wide angle camera and the telephoto camera when capturing images, for example, depending on distances between the image capture device and objects in the scene to be captured. Because the different cameras may have different field of views (FOVs), different resolutions, and different relative rotations, the user may perceive undesirable shifts in the displayed image, such as a displayed preview image when switching active cameras. Consequently, systems and methods are needed for switching between cameras of the image capture device based on the estimated focal length without the user perceiving undesirable shifts in the displayed images.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as a security system with two or more cameras, smartphones, tablets, laptop computers, digital video and/or still cameras, web cameras, and so on) configured to or capable of capturing images or video. While described below with respect to a device having or coupled to two camera, aspects of the present disclosure are applicable to devices having or coupled to any number of multiple cameras and are therefore not limited to devices having two cameras. Aspects of the present disclosure are applicable for capturing still images as well as for capturing video and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

FIG. 1 is a block diagram of an example device 100 within which aspects of the present disclosure may be implemented. The example device 100 may include or be coupled to a first camera 101 and second camera 102, a processor 104, a memory 106 storing instructions 108, and a camera controller 110. The device 100 may optionally include (or be coupled to) a display 114 and a number of input/output (I/O) components 116. The device 100 may include additional features or components not shown. For example, a wireless interface, which may include a number of transceivers and a baseband processor, may be included for a wireless communication device. The device 100 may include or be coupled to additional cameras other than the first camera 101 and second camera 102. The disclosure should not be limited to any specific examples or illustrations, including the example device 100.

The first camera 101 and the second camera 102 may be capable of capturing individual image frames (such as still images) and/or capturing video (such as a succession of captured image frames). The memory 106 may be a non-transient or non-transitory computer readable medium storing computer-executable instructions 108 to perform all or a portion of one or more operations described in this disclosure. The memory 106 may also include a look-up table (LUT) 109 or other directory that can be accessed by processor 104 or the camera controller 110 (or both) when determining whether an estimated depth is within a corresponding range of focal lengths for each of the first camera 101 and the second camera 102. The device 100 may also include a power supply 118, which may be coupled to or integrated into the device 100.

The processor 104 may be or include one or more suitable processors capable of executing scripts or instructions of one or more software programs (such as instructions 108) stored within the memory 106. In some aspects, the processor 104 may be one or more general purpose processors that execute instructions 108 to cause the device 100 to perform any number of functions or operations. In additional or alternative aspects, the processor 104 may include integrated circuits or other hardware to perform functions or operations without the use of software. While shown to be coupled to each other via the processor 104 in the example of FIG. 1, the processor 104, the memory 106, the camera controller 110, the optional display 114, and the optional I/O components 116 may be coupled to one another in various arrangements. For example, the processor 104, the memory 106, the camera controller 110, the optional display 114, and/or the optional I/O components 116 may be coupled to each other via one or more local buses (not shown for simplicity).

The display 114 may be any suitable display or screen allowing for user interaction and/or to present items (such as captured images, video, or a preview image) for viewing by a user. In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone and speakers, and so on. The display 114 and/or the I/O components 116 may provide an image to a user and/or receive a user input for adjusting one or more settings of the camera 102 (such as selecting and/or deselecting a region of interest of a displayed image).

The camera controller 110 may include an image signal processor 112, which may be or include one or more image signal processors that can process captured image frames or video provided by the camera 102. In some example implementations, the camera controller 110 (such as the image signal processor 112) may also control operation of the cameras 101 and 102. In some aspects, the image signal processor 112 may execute instructions from a memory (such as instructions 108 from the memory 106 or instructions stored in a separate memory coupled to the image signal processor 112) to process image frames or video captured by the cameras 101 and 102. In other aspects, the image signal processor 112 may include specific hardware to process image frames or video captured by the cameras 101 and 102. The image signal processor 112 may alternatively or additionally include a combination of specific hardware and the ability to execute software instructions.

A field of view (FOV) of an image sensor may refer to an angle through which an image sensor (or camera) may capture image data. The FOV of an image sensor may be determined by the focal length of the camera lens and the size of the image sensor capture area. A camera lens having a longer focal length (such as a telephoto lens) may correspond to less of a scene being captured in a given sensor area, thus having a relatively small FOV. A camera lens having a shorter focal length (such as a wide angle lens) may correspond to more of a scene being captured in a given sensor area, thus having a relatively large FOV. As discussed above, the range of depth, or the distance between the camera and an object in a scene, is directly related to the focal length of the camera lens.

Figure 2:
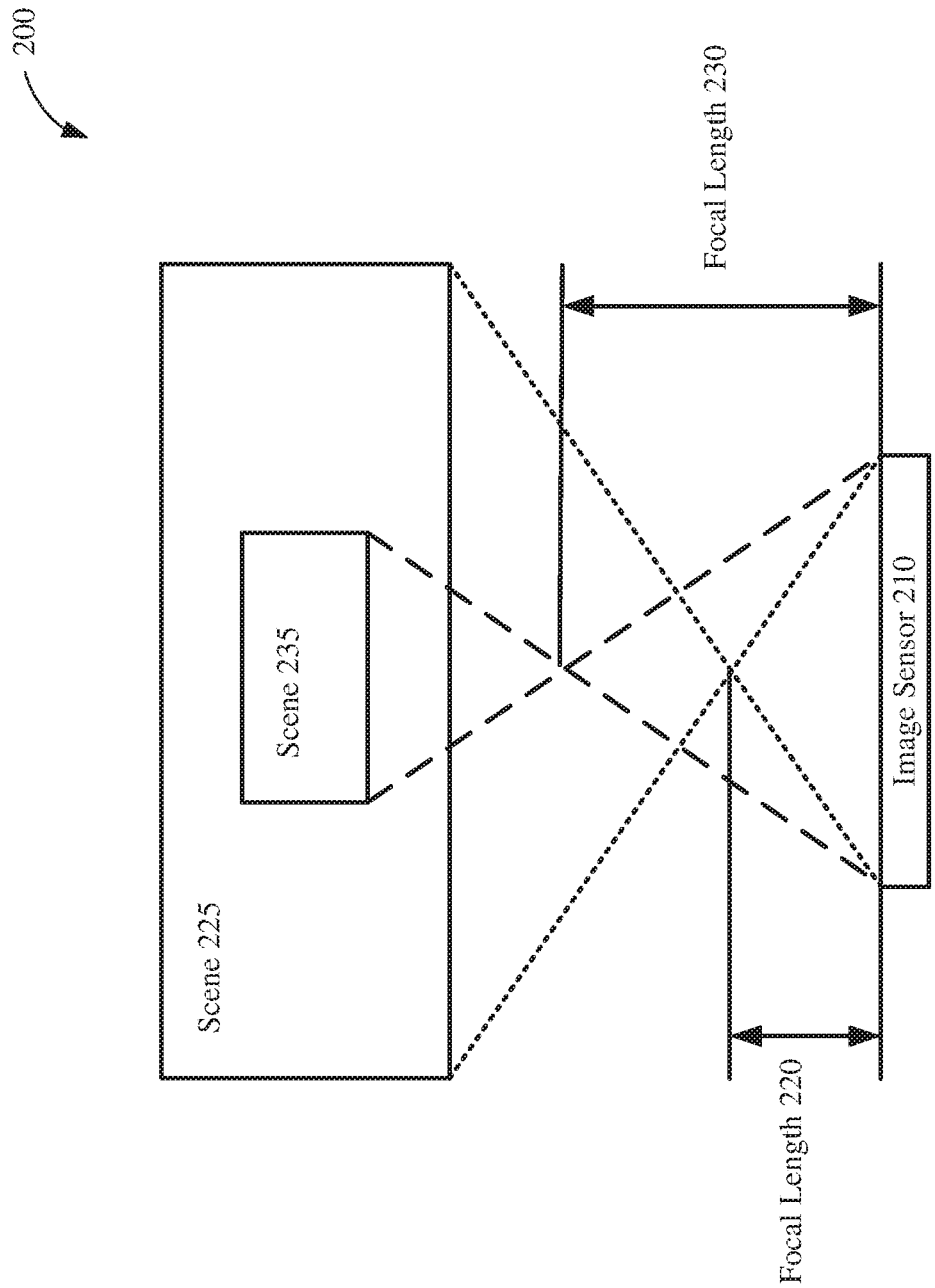
FIG. 2 shows an example relationship between the field of view (FOV) of an image sensor and the focal length of the image sensor.

FIG. 2 shows an example relationship 200 between the field of view (FOV) of an image sensor 210 and the focal length of the image sensor 210. The image sensor 210 may be capable of capturing image data at each of a first focal length 220 and a second focal length 230, where the first focal length 220 is shorter than the second focal length 230. As shown in FIG. 2, at the first focal length 220, a first portion of a scene 225 may be within the FOV of the image sensor 210, while at the second focal length 230, a second portion of a scene 235 may be within the FOV of the image sensor 210. As described above, the shorter focal length (first focal length 220) corresponds to a larger FOV, which may capture a wider scene (such as the scene 225) as compared to the longer focal length (second focal length 230), which may capture a narrower scene (such as the scene 235).

While cameras having relatively large focal lengths (such as cameras having telephoto lenses) may be useful for capturing distant scenes, such cameras may have a minimum focus distance (which may depend on a thickness of the camera module). While extension tubes may be used to extend this minimum focus distance to be closer to the image subject (such as in digital single-lens reflex (DSLR) cameras), the relatively small form factor of mobile computing devices such as mobile phones make extension tubes impractical for such devices.

Some example devices may include a camera having a telephoto lens and a camera having a wide angle lens. Some other example devices may include 3 or more cameras (such as a camera having a telephoto lens, a camera having a wide angle lens, and a camera having an ultrawide angle lens). It is noted that a particular camera may not be able to focus on objects closer than a corresponding threshold distance. For example, a telephoto camera is typically not able to focus on nearby objects, for example closer than 50 cm, for imaging without sending the focusing plane of the camera beyond the image sensor. However, telephoto cameras are typically better at capturing images of distant objects. Wide angle cameras may be able to focus on objects nearer to the camera, as compared to telephoto cameras, and may for example be able to focus on objects at a distance of 10 cm or greater. Thus, the wide angle camera may be able to focus on objects in the scene that are between 10 cm and 50 cm away from the camera, while a telephoto camera may be unable to focus on such objects. More generally, devices may have a plurality of cameras, each having a lens with a different focal range. It would therefore be desirable to efficiently and automatically switch between cameras having different focal ranges based on distances between the camera and objects in a scene.

The example implementations described herein may allow a device (or a user) to efficiently and automatically switch between different cameras based on an estimated distance between the device and one or more objects in the scene. In some implementations, undesirable shifts or changes in the displayed image associated with switching between cameras of a device may be avoided by switching between cameras during a focusing operation. In some implementations, undesirable shifts or changes in the image may be further minimized by compensating for one or more differences between the cameras, such as differences in FOVs, differences in resolution relative rotations, and differences in viewpoints. For example, applying one or more spatial transforms may compensate for the one or more differences between the cameras.

Because the depth or distance to an object in a scene is directly related to the focal length of a camera lens, estimating or determining the depth may provide an indication as to whether or not an active camera is capable of focusing, and consequently, whether or not to switch to a different camera that can more effectively focus on the object.

A variety of techniques may be used for estimating the depth of an object in a scene. In some implementations, laser detection may be used to determine depth. An emitter may project a beam of light, and light reflected by the subject may be received by a sensor. The speed of light and the detected travel time may then be used to estimate the depth.

In other implementations, the depth to an object in a scene may be determined based on phase detection using one or more focus pixels of the active image sensor. Such focus pixels may be configured to measure brightness from each of at least two different directional perspectives. For example, one or more pixels may be dual photodiode (2PD) pixels, where each 2PD pixels includes a first photodiode and a second photodiode and may be configured to measure brightness from each of a first perspective and a second perspective (e.g., left and right, or upper and lower perspectives). Similarly, pixels may be grouped into groups of 2 or 4 (pairs or quads, respectively), where each group has an overcoating layer (OCL) such as a micro-lens, to directionally limit the perspective of brightness measured in each group. Further, one or more pixels may be directionally masked in order to limit the perspective of measured brightness. The different perspectives of the focus pixels may be used to determine a depth to objects in the scene. The depths may be determined based on a disparity (or PD) between measurements from the focus pixels associated with a first perspective and measurements from the focus pixels associated with the second perspective. Such a PD may refer to an apparent difference in location of the object as viewed from the first perspective and the second perspective. For example, a sum of absolute differences (SAD) metric may be used for determining PD. This PD may then be used as part of an focusing operation, such as a phase detection autofocus (PDAF) operation, for focusing the camera.

In some other implementations, measurements from two different cameras may be used for determining the depth to an object in a scene. A first camera and a second camera may measure brightness from two different perspectives. For example, the two cameras may be horizontally or vertically separated, corresponding respectively to left and right perspectives or upper and lower perspectives. A disparity between corresponding measurements from the first camera and measurements from the second camera may be used for determining the depth. This disparity may also be used as part of a focusing operation, such as a PDAF operation.

In some other implementations, the depth to an object in a scene may be determined using one or more time of flight measurements. For example, a light signal, which may be provided by a laser or a light emitting diode (LED), may be transmitted from the camera, reflected off the object in the scene, and received by an image sensor at the camera. The round trip time of the light signal received at the image sensor corresponds to the depth of the object.

In some other implementations, measurements from a structure light system may be used to determine the depth to an object in a scene. Such a structured light system may include a transmitter and a receiver configured to transmit and receive patterns corresponding to spatial codes (or "codewords") to generate a depth map that indicates the distance of one or more objects in a scene from the imaging device. The farther away an object in a scene is from the transmitter and the receiver, the closer a received codeword reflected from the object is from its original position (compared to the transmitted codeword) because a propagation path of the outgoing codeword and the reflected incoming codeword are more parallel. Conversely, the closer the object is to the transmitter and receiver, the farther the received codeword is from its original position in the transmitted codeword. Accordingly, the difference between the position of a received codeword and the corresponding transmitted codeword may be used to determine the depth of an object in a scene.

In some implementations, the depth may be determined for one or more objects in a region of interest (ROI) in a scene. For example, such an ROI may contain one or more objects considered to be in the foreground of the scene. In another example, the ROI may include one or more objects in a center of the scene. In another example, the ROI may be manually selected by a user of the device 100. In another example, the ROI may be automatically selected by the device 100.

As discussed above, devices, such as device 100, may perform focusing operations to ensure that the captured images of a subject are in focus. For example, such focusing operations may include one or more of a PDAF operation or a contrast detection autofocus (CDAF) operation. In some other examples, the device 100 may perform a hybrid AF operation that includes both CDAF and PDAF.

Figure 3:
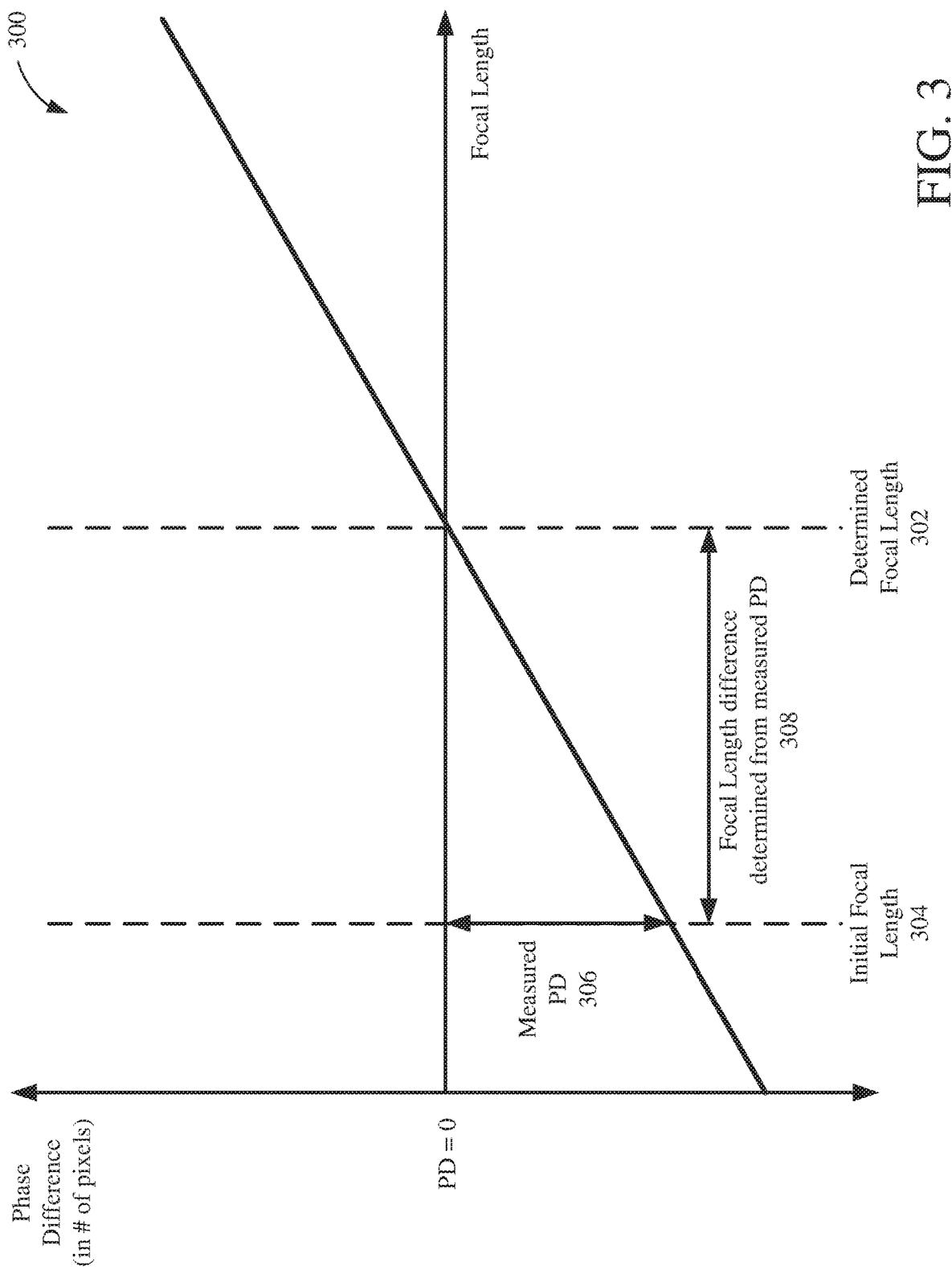
FIG. 3 shows an example correlation between focal length and phase difference for a phase difference autofocus operation.

FIG. 3 shows an example correlation 300 between focal length and PD for a PDAF operation. As illustrated, the correlation 300 between focal length and PD 306 for a PDAF operation is linear. If the PD 306 is measured for an initial focal length 304, the device 100 may determine the focal length difference 308 (based on the slope and offset of the PD line) to adjust a lens of camera 101 or camera 102 in order to place the lens at the determined focal length 302 (where the PD is approximately zero). When the PD is approximately zero, then images of subjects at the depth corresponding to the measured PD 306 should be in focus.

In another example, the device 100 may perform a contrast detection autofocus (CDAF) operation, where the focus value is a contrast measurement. When an image goes from out of focus to in focus, the contrast (such as the difference in pixel intensity) between neighboring pixels increases. For example, the difference in intensity between neighboring pixels for a blurry image is lower than the difference in intensity between neighboring pixels for an in-focus image.

Figure 4:
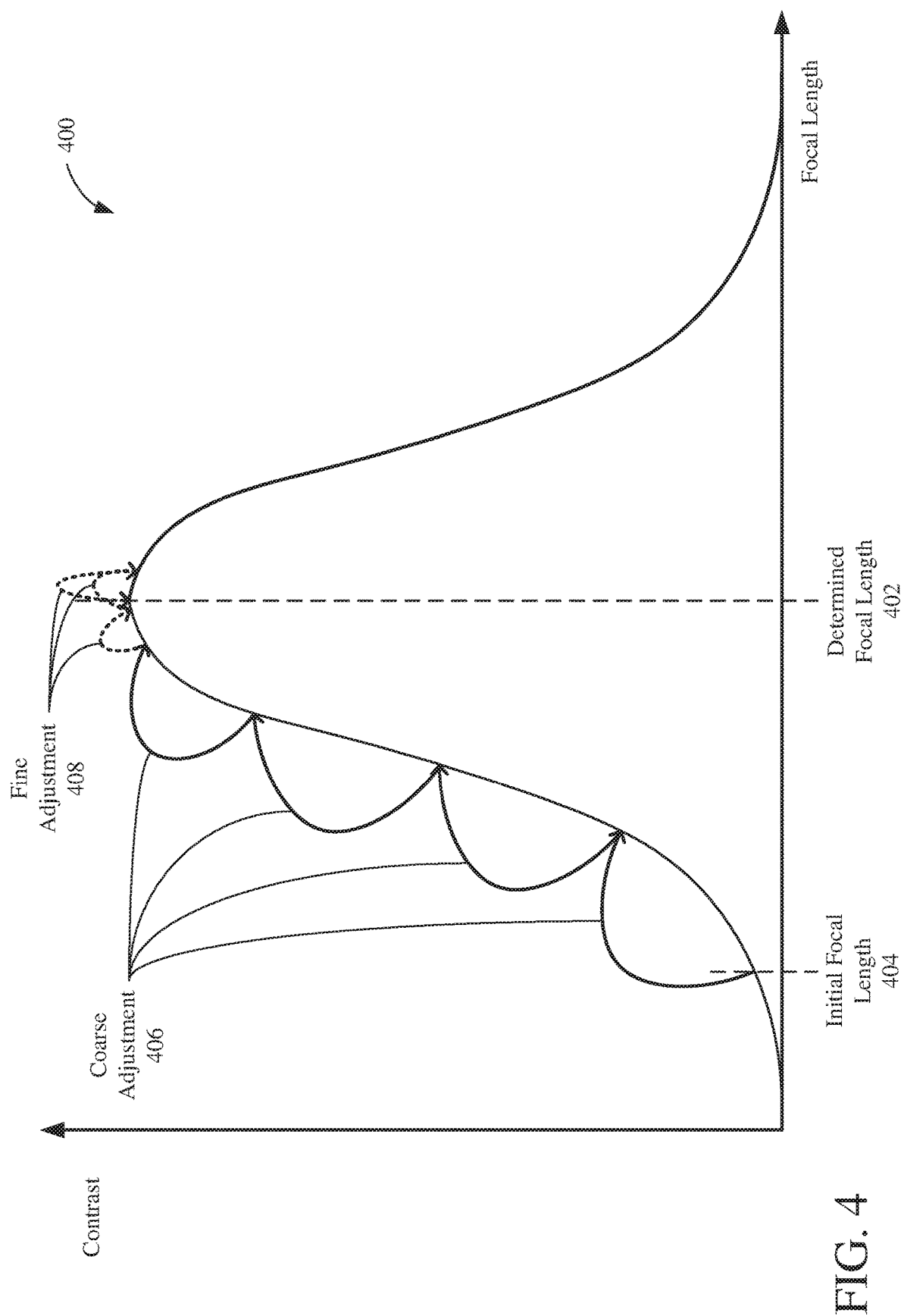
FIG. 4 shows an example correlation between focal length and contrast for a contrast detection autofocus operation.

FIG. 4 shows an example correlation 400 between focal length and contrast for a CDAF operation. As shown, the correlation 400 between focal length and contrast for a CDAF operation is parabolic/second order. The exact curvature may differ, and the example correlation 400 is for illustrative purposes only. For example, the correlation 400 may be expressed in general by a second order equation $y=ax^2+bx+c$, where the contrast is denoted by the term y, the focal length is denoted by the term x, the curvature of the parabola is denoted by the term a, the slope of the parabola is denoted by the term b, and the offset of the parabola is denoted by the term c. The focal length 402 to be determined is based on the contrast being at a maximum, which is the vertex of the parabola. For example, the vertex is $-b/2a$ for the example second order equation.

For CDAF, the device 100 may perform one or more coarse adjustments 406 from the initial focal length 404, and then perform one or more fine adjustments 408 to the determined focal length 402. The device 100 may perform an iterative process of measuring the contrast, adjusting the focal length, and measuring the contrast until the peak in contrast (such as the vertex of the contrast curve) is found (and therefore the focal length 402 is determined).

As mentioned above, in some implementations, the device 100 may perform a hybrid AF operation that combines aspects of both CDAF and PDAF. For example, the hybrid AF operation may incorporate a coarse adjustment and a fine adjustment, as with the CDAF operation discussed above with respect to FIG. 4. However, in contrast to CFAF, in the hybrid AF operation, the coarse adjustment may determine the measured PD 306, and may adjust the focal length to the determined focal length 302, as discussed above with respect to FIG. 3. Then, a contrast-based fine adjustment may be performed, such as fine adjustment 408.

A determination to switch the active camera may be based at least in part on the determined depth. Thus, after the depth has been determined, a determination may be made as to whether or not the active camera should be switched in order to focus on objects at that depth. For example, if the depth is less than the minimum focus distance of the active camera, then a determination may be made to switch to a camera having a shorter focal length.

Figure 5A:
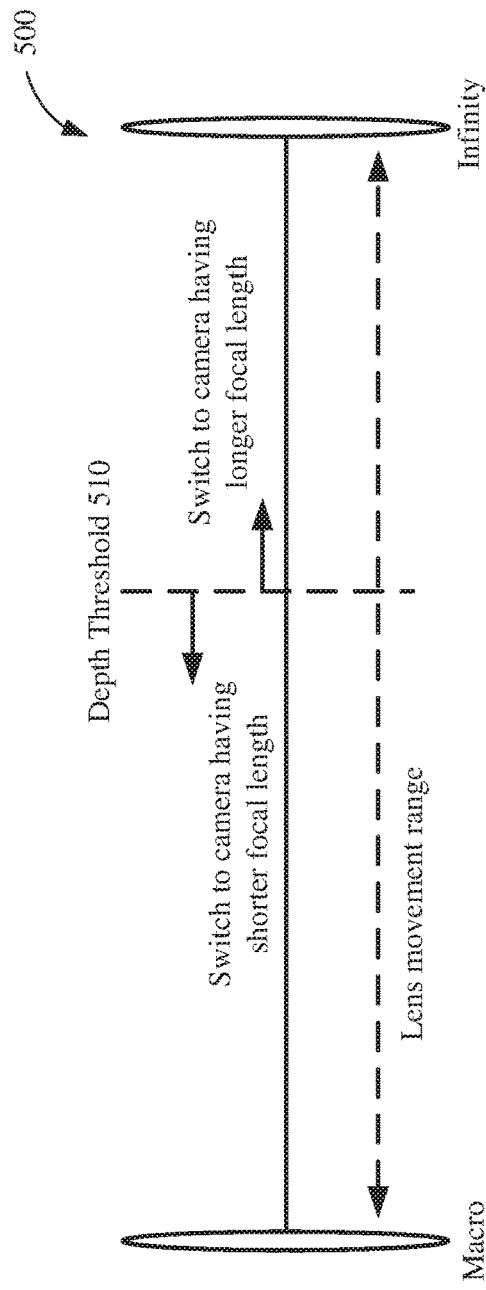
FIG. 5A shows an example lens movement range for a device having two cameras, in accordance with some implementations.

FIG. 5A shows an example lens movement range 500 for a device having two cameras, in accordance with some implementations. With respect to FIG. 5A, the device may include a first camera having a shorter focal length, and a second camera having a longer focal length, and the lens movement range 500 may vary between a macro end and infinity. For example, the first camera may be a wide-angle camera and the second camera may be a telephoto camera. After determining the depth using one or more of the operations discussed above, the depth may be used for determining whether to switch the active camera. For example, such a determination may be made based on comparing the determined depth to a depth threshold 510 corresponding to the minimum focus distance of the second camera. If the determined depth is less than the depth threshold 510, then the second camera may be inappropriate, for example, because the depth is less than the minimum focus distance of this camera, as discussed above. Accordingly, if the active camera is the second camera, and the determined depth is less than depth threshold 510, a determination may be made to switch to the first camera. Similarly, if the first camera is active, and the determined depth is greater than the depth threshold 510, then a determination may be made to switch to the second camera. In this situation, objects at the determined depth may fill a larger proportion of captured images due to the smaller FOV of the second camera (as compared to the first camera, which has a wider angle FOV). Thus, depths shorter than depth threshold 510 may correspond to the first camera being more appropriate as the active camera, while depths greater than depth threshold 510 may correspond to the second camera being more appropriate as the active camera.

Figure 5B:
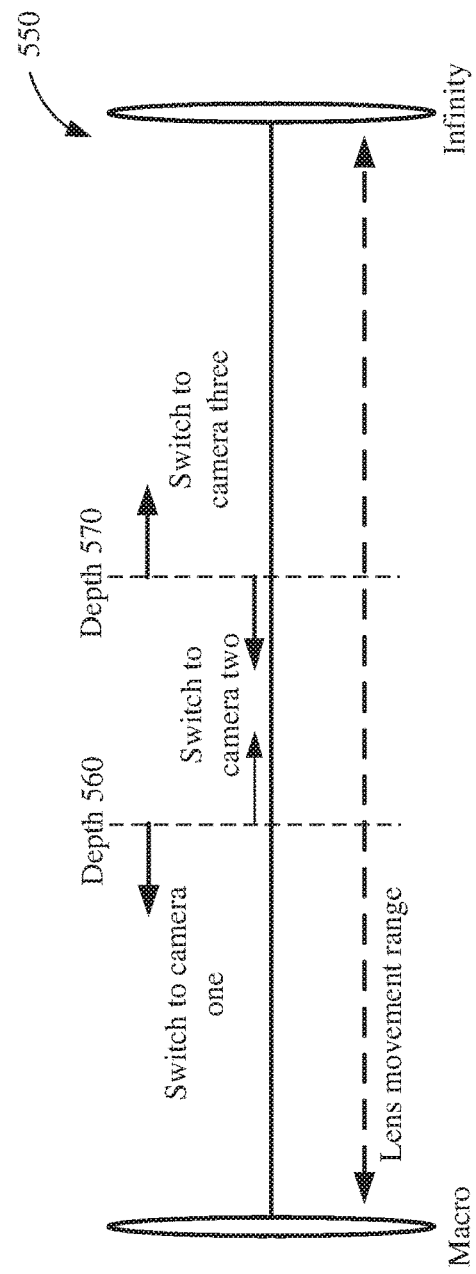
FIG. 5B shows an example lens movement range for a device having three cameras, in accordance with some implementations.

As noted above, some example devices may include more than two cameras. For example, FIG. 5B shows an example lens movement range 550 for a device having three cameras, in accordance with some implementations. With respect to FIG. 5B, the device may include a first camera having a shortest focal length, a second camera having a second shortest focal length, and a third camera having a longest focal length. In one example, the first camera one may be an ultrawide angel camera, the second camera may be a wide angle camera, and the third camera may be a telephoto camera. In a manner similar to FIG. 5A, the lens movement range 550 may vary between the macro end and infinity, and a determination may be made as to whether or not to switch the active camera based on the determined depth. For example, if the second camera or the third camera is active, and the determined depth is less than depth 560 (which may correspond to a minimum focus distance of the second camera, and may be less than the minimum focus distance of the third camera), then a determination may be made to switch to the first camera one. Similarly, when the first camera or the third camera is active, and the determined depth is greater than depth 560 but less than depth 570 (which may correspond to a minimum focus distance of the third camera), a determination may be made to switch to the second camera. Further, the more limited FOV of the second camera as compared to the first camera may allow for objects in this depth range to fill a larger proportion of captured images. Finally, if the first camera or the second camera is active, and the determined depth is greater than depth 570, a determination may be made to switch to the third camera.

While FIGS. 5A and 5B show example lens movement ranges for devices having two and three cameras, respectively, aspects of the present disclosure may be implemented in devices that include more than three cameras. For example, an example device may include a plurality of cameras, each associated with a respective range of focal lengths for which each camera is most appropriately used. Similar to the lens movement ranges 500 and 550 of FIGS. 5A and 5B, respectively, determining that the depth corresponds to a particular range of focal lengths may indicate that switching to the corresponding camera is appropriate.

In some implementations, a determination to switch cameras may be limited to occasions when the estimated depth is less than the minimum focal length of the currently active camera. For example, with respect to FIG. 5A, a determination to switch cameras may be limited to when the second camera is active, and the estimated depth is less than the depth threshold 510. That is, for such implementations, a determination to switch cameras may not be made when the first camera is active, and the estimated depth is greater than the depth threshold 510. This limitation may further reduce the user's perception of the camera switching operation by limiting such camera switching operations to occasions in which camera switching is required for focusing on objects at the estimated depth.

After determining to switch cameras (such as from a first camera to a second camera), the second camera may be set as the active or master camera, and the first camera may be set as the inactive or slave camera. Thus, before the camera switch, the images may be provided by the first camera, and after the camera switch, the images may be provided by the second camera. As discussed above, when switching from the first camera to the second camera, a user may perceive a sudden change in the displayed image, for example, due to different FOVs, different resolutions, and different relative rotations between the first camera and the second camera.

The example implementations described herein may minimize the user's perception of this sudden change in the displayed image by one or more of timing the camera switching operation or adjusting one or more parameters of the second camera. For example, the camera controller 110 may receive relevant information such as the trigger switch distance and a region of interest (ROI) and may adjust the one or more parameters of the second camera to match corresponding parameters of the first camera. In one example, when switching from a telephoto camera to a wide angle camera, an FOV of the wide angle camera may be adjusted (such as cropped) to match the FOV of the telephoto camera. Thus, the user will not perceive a sudden change of FOV. Similarly, when switching to the second camera, adjusting the one or more parameters may include compensating for a baseline between the first camera and the second camera by applying one or more spatial transforms, compensating for a relative rotation between the first camera and the second camera by applying one or more spatial transforms, and adjusting one or more parameters for synchronizing 3A (auto-exposure, autofocus, auto-white-balance) between the first camera and the second camera.

In order to further reduce the user's perception of the camera switching operation, the camera switching operation may be performed during a focusing operation of an example device. Performing the camera switching operation during the focusing operation may reduce the user's perception of shifts in the image by switching the camera before the image has focused. More specifically, prior to focusing, the image may be blurry and out of focus, and switching from one out-of-focus image from the first camera to another out-of-focus image from the second camera may help to reduce the user's perception of the camera switch. In some implementations, the focusing operation may include a coarse and a fine focusing operation, such as the CDAF focusing operation as described above with respect to FIG. 4. For such a focusing operation, the camera switch may be performed during the coarse adjustment 406. In other implementations, the focusing operation may include a PDAF focusing operation, such as described above with respect to FIG. 3. For such a PDAF focusing operation, the camera switch may be performed after measuring the PD 306 but before the focal length has completed being adjusted to the determined focal length 302.

After completion of the camera switching operation, the focusing operation may be completed using the second camera. For example, for a CDAF or a hybrid CDAF/PDAF focusing operation, all or part of a coarse focusing operation may be completed using the first camera before the camera switch, and after the camera switch, the remaining portion of the coarse focusing operation and the fine focusing operation may be performed using the second camera. In some implementations, the coarse focusing operation may be completed using the first camera before the camera switch, and the fine focusing operation may be completed using the second camera after the camera switch.

FIG. 6 is an illustrative flow chart depicting an example operation 600 for switching an active camera in an image capture device, according to some implementations. The operation 600 may be performed by any suitable device including or coupled to two or more cameras, such as the device 100 of FIG. 1. For example, the two or more cameras may include a wide angle camera and a telephoto camera. In another example, the device may include three cameras, such as an ultrawide angle camera, a wide angle camera, and a telephoto camera. In another example the two or more cameras may include four or more cameras. The device 100 may estimate a focus distance associated with an image captured by the first camera (602). The focus distance may be associated with one or more objects in a region of interest (ROI) of the image. The focus distance may be estimated using any suitable depth estimation technique. For example, the focus distance may be estimated using laser detection, or phase detection. The phase detection may estimate the focus distance based on measurements from one or more focus pixels of one of the cameras or based on corresponding measurements from two different cameras of the device 100.

The device 100 may further determine, based at least in part on the estimated focus distance, whether to switch from the first camera to the second camera (604). For example, determining to switch from the first camera to the second camera may include determining that the estimated focus distance is outside of a first range of focus distances associated with the first camera and within a second range of focus distances associated with the second camera. Further, determining to switch from the first camera to the second camera may include determining that the estimated distance is less than a minimum focus distance associated with the first camera.

The device 100 may further switch from the first camera to the second camera (606). For example, the device 100 may switch from the first camera to the second camera during a focusing operation. The focusing operation may include a coarse focusing operation and a fine focusing operation. In some implementations switching from the first camera to the second camera may occur during the coarse focusing operation. The focusing operation may be any suitable focusing operation, such as a CDAF focusing operation, a PDAF focusing operation, or a hybrid focusing operation. Further, switching from the first camera to the second camera may include applying one or more spatial transforms to compensate for one or more differences between the first camera and the second camera, such as to compensate for one or more of a separation distance between the first camera and the second camera, a relative rotation between the first camera and the second camera, and a difference in field of view (FOV) between the first camera and the second camera.

The device 100 may complete the focusing operation using the second camera (608). For example, completing the focusing operation using the second camera may include completing the focusing operation without using the coarse focusing operation.

In some implementations, the device 100 may present an updated image captured by the second camera (610). For example, the updated image may be an image focused at the estimated depth.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 106 in the example device 100 of FIG. 1) comprising instructions 108 that, when executed by the processor 104 (or the camera controller 110 or the image signal processor 112), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the example implementations disclosed herein may be executed by one or more processors, such as the processor 104 or the image signal processor 112 in the example device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 100, the camera controller 110, the processor 104, and/or the image signal processor 112, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. An image capture device, comprising:
a memory storing instructions; and
a processor coupled to the memory and configured to:
receive an image from a first camera;
estimate a focus distance associated with the image;
determine, based at least in part on the estimated focus distance, whether to switch from the first camera to a second camera;
adjust a field of view (FOV) of the second camera to match a FOV of the first camera;
switch from the first camera to the second camera;
complete a focusing operation using the second camera; and
capture an image, using the second camera, at the FOV.

2. The image capture device of claim 1, wherein the focusing operation begins prior to switching from the first camera to the second camera.

3. The image capture device of claim 1, wherein the processor is configured to determine whether to switch from the first camera to the second camera by:
determining that the estimated focus distance is outside of a first range of focus distances associated with the first camera and within a second range of focus distances associated with the second camera.

4. The image capture device of claim 1, wherein the FOV of the first camera is selected by a user of the image capture device.

5. The image capture device of claim 1, wherein the focusing operation comprises a coarse focusing operation and a fine focusing operation, and wherein the processor is further configured to switch from the first camera to the second camera during the coarse focusing operation.

6. The image capture device of claim 1, wherein the focusing operation comprises a coarse focusing operation and a fine focusing operation, and wherein the processor is further configured to complete the focusing operation without the second camera using the coarse focusing operation.

7. The image capture device of claim 1, wherein the processor is configured to determine whether to switch from the first camera to the second camera by determining that the estimated focus distance is below a focus distance threshold associated with the first camera.

8. The image capture device of claim 1, further comprising a third camera, wherein each of the first camera, the second camera, and the third camera is associated with a corresponding range of focus distances.

9. The image capture device of claim 8, wherein the processor is further configured to determine, based at least in part on the estimated focus distance, whether to switch from the first camera to the third camera.

10. The image capture device of claim 1, wherein the processor is configured to switch from the first camera to the second camera by applying one or more spatial transforms to compensate for one or more differences in alignment or offset between the first camera and the second camera.

11. A method, performed by an image capture device, the method comprising:

estimating a focus distance associated with an image captured by a first camera;
determining, based at least in part on the estimated focus distance, whether to switch from the first camera to a second camera;
adjusting a field of view (FOV) of the second camera to match a FOV of the first camera;
switching from the first camera to the second camera;
completing a focusing operation using the second camera;
capturing an image, using the second camera, at the FOV.

12. The method of claim 11, wherein the focusing operation begins prior to switching from the first camera to the second camera.

13. The method of claim 11, wherein determining whether to switch from the first camera to the second camera further comprises:
determining that the estimated focus distance is outside of a first range of focus distances associated with the first camera and within a second range of focus distances associated with the second camera.

14. The method of claim 11, wherein the FOV of the first camera is selected by a user of the image capture device.

15. The method of claim 11, wherein the focusing operation comprises a coarse focusing operation and a fine focusing operation, and wherein switching from the first camera to the second camera occurs during the coarse focusing operation.

16. The method of claim 11, wherein the focusing operation comprises a coarse focusing operation and a fine focusing operation, and wherein the focusing operation is completed without the second camera using the coarse focusing operation.

17. The method of claim 11, wherein determining to switch from the first camera to the second camera further comprises determining that the estimated focus distance is below a focus distance threshold associated with the first camera.

18. The method of claim 11, wherein each of the first camera, the second camera, and a third camera is associated with a corresponding range of focus distances.

19. The method of claim 18, further comprising determining, based at least in part on the estimated focus distance, whether to switch from the first camera to the third camera.

20. The method of claim 11, wherein switching from the first camera to the second camera further comprises applying one or more spatial transforms to compensate for one or more differences in alignment or offset between the first camera and the second camera.

21. A non-transitory computer readable storage medium storing instructions that, when executed by one or more processors of an image capture device, cause the image capture device to:
estimate a focus distance associated with an image captured by a first camera;
determine, based at least in part on the estimated focus distance, whether to switch from the first camera to a second camera;
adjust a field of view (FOV) of the second camera to match a FOV of the first camera;
switch from the first camera to the second camera;
complete a focusing operation using the second camera;
capture an image, using the second camera, at the FOV.

22. The non-transitory computer readable storage medium of claim 21, wherein execution of the instructions further causes the image capture device to begin the focusing operation prior to switching from the first camera to the second camera.

23. The non-transitory computer readable storage medium of claim 21, wherein execution of the instructions to determine whether to switch from the first camera to the second camera further causes the image capture device to determine that the estimated focus distance is outside of a first range of distances associated with the first camera and within a second range of focus distances associated with the second camera.

24. The non-transitory computer readable storage medium of claim 21, wherein the focusing operation comprises a coarse focusing operation and a fine focusing operation, and wherein execution of the instructions to switch from the first camera to the second camera further causes the image capture device to switch from the first camera to the second camera during the coarse focusing operation.

25. The non-transitory computer readable storage medium of claim 21, wherein execution of the instructions to determine whether to switch from the first camera to the second camera further causes the image capture device to determine that the estimated focus distance is below a focus distance threshold associated with the first camera.

* * * * *